United States Patent
Rösch et al.

[11] Patent Number: 5,756,621
[45] Date of Patent: May 26, 1998

[54] 2-OXAZOLINYL-TERMINATED POLYMERS AND OLIGOMERS USEFUL AS COMPATIBILIZERS

[75] Inventors: Joachim Rösch, Ludwigshafen; Hans-Joachim Müller, Grünstadt; Arthur Höhn, Kirchheim; Rolf Muelhaupt, Freiburg; Christof Woerner, Vogtsburg, all of Germany

[73] Assignee: BASF Aktiengesellschaft, Ludwigshafen, Germany

[21] Appl. No.: 686,909

[22] Filed: Jul. 26, 1996

[30] Foreign Application Priority Data

Aug. 1, 1995 [DE] Germany ............ 195 28 192.6

[51] Int. Cl.$^6$ ............ C08F 34/02; C08F 22/40; C08F 24/00
[52] U.S. Cl. ............ 526/260; 525/380; 526/270; 526/348; 526/348.2; 526/348.3; 526/348.6
[58] Field of Search ............ 526/260, 263, 526/270; 525/380

[56] References Cited

U.S. PATENT DOCUMENTS

| | | | |
|---|---|---|---|
| 3,488,294 | 1/1970 | Annand | 252/391 |
| 4,474,923 | 10/1984 | Keskey | 524/458 |
| 5,144,002 | 9/1992 | Kowalczik | 528/218 |

FOREIGN PATENT DOCUMENTS

| | | |
|---|---|---|
| 0 234 114 | 9/1987 | European Pat. Off. . |
| 0 394 854 | 9/1987 | European Pat. Off. . |

OTHER PUBLICATIONS

Zeigler Catalysts, pp. 35–55, 1995, R. Muelhaupt, "Novel Polyolefin Materials and Processes: Overview and Prospects".

Polymer 6, pp. 579–587, 1965, J.P. Kennedy, et al., "Fundamental Studies on Cationic Polymerization IV–Homo– and Co–Polymerizations with Various Catalysts".

Journal Am. Chem. Soc., vol. 78, pp. 2656–2657, Jun. 5, 1956, M. Szwarc, et al., "Polymerization Initiated By Electron Transfer to Monomer. A New Method of Formation of Block Polymers".

Ullmann's Encyclopedia of Ind. Chem., vol. A5, pp. 217–234, 1986, W. Bertleff, "Carbonylation".

Comprehensive Polymer Science, vol. 6, pp. 403–421, 1989, P.F. Rempp, et al., "Synthesis of Graft Copolymers".

Ring Opening Polymerisation, pp. 239–262, 1993, Y. Chujo, et al., "Polymerization of Oxazoline Family".

*Primary Examiner*—Fred Zitomer
*Attorney, Agent, or Firm*—Oblon, Spivak, McClelland, Maier & Neustadt, P.C.

[57] ABSTRACT

Polymers and oligomers of olefinically unsaturated $C_2$–$C_{20}$-hydrocarbons having one or two 2-oxazolinyl end groups have the structure (I)

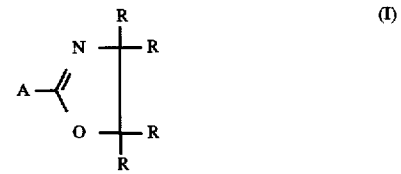

where A is a polymer or oligomer radical derived from the olefinically unsaturated $C_2$–$C_{20}$-hydrocarbons and the radicals R can be identical or different and have the following meanings:
hydrogen,
$C_1$–$C_{10}$-alkyl,
$C_6$–$C_{10}$-aryl,
$C_3$–$C_6$-cycloalkyl.

8 Claims, No Drawings

2-OXAZOLINYL-TERMINATED POLYMERS AND OLIGOMERS USEFUL AS COMPATIBILIZERS

The present invention relates to polymers and oligomers of olefinically unsaturated $C_2$–$C_{20}$-hydrocarbons having one or two 2-oxazolinyl end groups of the structure (I)

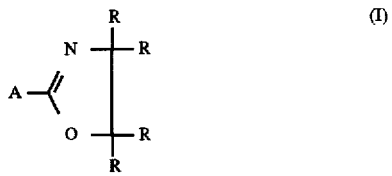

where A is a polymer or oligomer radical derived from the olefinically unsaturated $C_2$–$C_{20}$-hydrocarbons and the radicals R can be identical or different and have the following meanings:

hydrogen,
$C_1$–$C_{10}$-alkyl,
$C_6$–$C_{10}$-aryl,
$C_3$–$C_6$-cycloalkyl.

The invention also relates to comb polymers (II) and (III) obtainable by cationic ring-opening homo- or copolymerization of the compounds (I) or by reaction of a base polymer having reactive groups with the compounds (I).

The invention further relates to thermoplastic molding materials or thermosets comprising compounds (I) or comb polymers (II) or (III) or mixtures of (I) to (III).

The invention also relates to a process for preparing the compounds (I) and to a process for preparing comb polymers (II) and (III) from the compounds (I).

The present invention further relates to the use of the compounds (I), (II) or (III) or mixtures thereof as compatibilizers in polymer blends and to the use of the thermoplastic molding materials or thermosets comprising the compounds (I), (II) or (III) or mixtures thereof for producing films, fibers or molded articles, and to the films, fibers and molded articles obtainable therefrom.

To obtain plastics having desirable properties, it is customary in plastics technology to blend pure polymers having different physical properties. Owing to their difference in polarity, however, many pure polymers, such as apolar polyolefins and polar polyesters, are not homogeneously miscible. To make the different polymers miscible, compatibilizers are added to the polymer blends.

Compatibilizers in general are polymers containing not only structural segments which are miscible with one of the blending partners but also segments which are miscible with the second or further blending partners.

Such compounds are for example the Ziegler-Natta polyolefins known from EP-A-0 234 114, which have a carboxyl or hydroxyl end group. However, such functional end groups have only limited scope for chemical modification, and monofunctionally terminated Ziegler-Natta polymers are not useful as monomers for polymerization, for example ring-opening polymerization.

EP-A-0 394 854 describes a process for preparing 2-alkyl- or 2-alkenyl-2-oxazolines from vegetable oils. Because of the broad fatty acid spectrum of vegetable oils, such oxazoline derivatives are too heterogeneous in their composition—and the fatty acid radicals not long enough—to be good compatibilizers, for example in respect of polyolefins, or to facilitate miscibility with polyolefins.

It is an object of the present invention to remedy the above-described defects and to develop oligomers or polymers with specific end groups which, on the one hand, shall themselves be usable as compatibilizers for polymers of differing polarity, but, on the other, shall also be useful as monomers or reactants for preparing compatibilizers having a comb polymer structure.

We have found that this object is achieved by the polymers and oligomers of olefinically unsaturated $C_2$–$C_{20}$-hydrocarbons having one or two 2-oxazolinyl end groups of the structure (I)

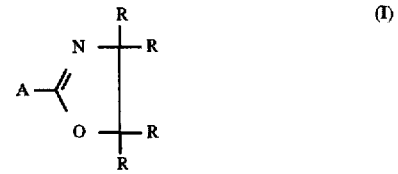

where A is a polymer or oligomer radical derived from the olefinically unsaturated $C_2$–$C_{20}$-hydrocarbons and the radicals R can be identical or different and have the following meanings:

hydrogen,
$C_1$–$C_{10}$-alkyl,
$C_6$–$C_{10}$-aryl,
$C_3$–$C_6$-cycloalkyl.

This invention further provides comb polymers (II) obtainable by cationic ring-opening homo- or copolymerization of compounds (I) as claimed in claim 1 and also comb polymers (III) obtainable by reaction of compounds (I) as claimed in claim 1 with a base polymer containing reactive groups.

This invention further provides the above-defined thermoplastic molding materials and thermosets.

This invention further provides a process for preparing the above-defined polymers and oligomers (I), a process for preparing the above-defined comb polymers (II) by cationic ring-opening polymerization, and also a process for preparing the above-defined comb polymers (III) by reacting a base polymer having reactive groups with the above-defined polymers and oligomers (I).

Finally this invention provides for the use of the above-defined compounds (I), (II) or (III) or mixtures thereof as compatibilizers in polymer blends and also for the use of these thermoplastic molding materials or thermosets comprising compounds (I), (II) or (III) or mixtures thereof for producing films, fibers and molded articles, and also the films, fibers and molded articles obtainable therefrom.

The olefinically unsaturated $C_2$–$C_{20}$-hydrocarbons underlying the polymers and oligomers (I) of this invention can be $C_2$–$C_{20}$-monoenes or $C_4$–$C_{20}$-dienes, for example 1,3-butadiene, and also aromatic vinyl compounds such as styrene or a-methylstyrene. Preference is given to using $C_2$–$C_{10}$-alk-1-enes such as ethene, propene, 1-butene, isobutene, 1-pentene, 1-hexene, 1-heptene, 1-octene, 1-nonene or 1-decene as monomers. Very particular preference is given to propene and isobutene.

The monomers are generally polymerized using the literature-known polymerization processes to the desired degree of oligomerization or polymerization or the desired molecular mass $\overline{M}_n$.

The 1-alkenes having a vinylic double bond, for example ethene, propene or 1-butene, are generally polymerized in a Ziegler polymerization or Phillips polymerization, but preferably in a polymerization involving metallocene catalysts, as described by way of example in R. Mulhaupt in Ziegler Catalysts, Springer-Verlag, Berlin 1995, pages 35 et seq. The metallocene compounds used are generally bis(cyclopentadienyl)zirconium dichloride, bis (pentamethylcyclopentadienyl) zirconium dichloride, bis(indenyl)-zirconium dichloride, bis(n-butylcyclopentadienyl)zirconium dichloride, bis(n-octadecylcyclopentadienyl)zirconium dichloride or bis(tetrahydroindenyl)zirconium dichloride, but preferably bis(n-octadecylcyclopentadienyl)zirconium dichloride, bis (cyclo-pentadienyl)zirconium dichloride, bis (tetrahydroindenyl)zirconium dichloride and bis (pentamethylcyclopentadienyl)zirconium dichloride.

The resulting 1-alkene oligomers or polymers customarily have an average molecular mass $\overline{M}_n$ of from 300 to 15,000, preferably of from 300 to 2,500.

Isobutene is generally polymerized by means of a cationic polymerization, as described in J. P. Kennedy, R. G. Squires, Polymer 6 (1965), 579, to form polyisobutylene having a molecular mass $\overline{M}_n$ of from 300 to 15,000, preferably of from 800 to 2,500.

Styrene is generally polymerized by means of anionic polymerization using, for example, n-butyllithium as initiator, as described in M. Swarc, J. Amer. Chem. Soc. 78 (1956), 2656, to form a polystyrene anion and the "living" polymer or oligomer chains which have a molecular mass $\overline{M}_n$ of from 300 to 15,000, preferably of from 500 to 2,500, are reacted with carbon dioxide to form the carboxylic acid.

The oligomers or polymers of olefinically unsaturated $C_2$–$C_{20}$-hydrocarbons obtainable by the various polymerization processes generally have a linear structure, ie. virtually no side groups, whose number of carbon atoms is greater than the total number of carbon atoms of the monomer minus two carbon atoms.

Their degree of polymerization is generally greater than 10, and the number average molecular mass $\overline{M}_n$, measured by the method of gel permeation chromatography (GPC) at 135° C. in 1,2,4-trichloro-benzene (polyethylene standard or polypropylene standard), is generally within the range from 300 to 15,000. The molecular mass distribution $\overline{M}_w/\overline{M}_n$, measured by the method of GPC, as already mentioned, is customarily within the range from 1 to 3.

The substituent A in (I) describes the hydrocarbon radical derived from the oligomers and polymers obtainable as described.

The hydrocarbon oligomers or polymers other than those of styrene generally contain terminal double bonds which, depending on the monomer/catalyst combination involved in the oligomer preparation, are vinylic or vinylidenic in nature.

The level of these terminal double bonds generally depends on the reaction conditions. Typically, the oligomers or polymers of propene or isobutene contain one terminal double bond per chain.

The oligomers or polymers of prochiral olefins are generally, depending on the reaction conditions, atactic, isotactic or syndio-tactic. Generally, the polymerization or oligomerization of $C_3$–$C_{10}$-1-alkenes, in particular propene, using bis(cyclopentadienyl) zirconium dichloride catalyst systems will yield an atactic material.

The above-defined monomers, as well as undergoing homopolymerization, can also be copolymerized with each other in any desired ratio. In general, preference is given to copolymerizing 1-alkenes (including ethene), especially propene.

Generally, the non-polar-functionalized polymers and oligomers obtainable from olefinically unsaturated $C_2$–$C_{20}$-hydrocarbons by the processes described will be modified at the chain end(s) with, respectively, one or two ester groups.

Generally this is done by means of art-known reactions at the terminal vinyl or vinylidene double bonds of the polymers or oligomers, for example maleination, addition of SiH- or thiol-functionalized carboxylic esters and also, preferably, hydroformylation in the presence of alcohols as solvents (W. Bertleff, Ullmann's Encyclopedia of Industrial Chemistry 5th ed., Verlag Chemie Weinheim 1986, vol. A5, pages 217 et seq.).

As described above, the oligomer or polymer anions obtainable by anionic polymerization of styrene or its derivatives are generally reacted with carbon dioxide to form the carboxylic acid, which is then converted into carboxylic esters using esterification processes known to those skilled in the art.

The synthesis of the terminal 2-oxazoline ring of (I) is generally effected by reacting the ester-terminated oligomers or polymers of olefinically unsaturated $C_2$–$C_{20}$-hydrocarbons with 2-amino-1-alcohols in the presence of protic acids and/or Lewis acids, as described in analogous terms in EP-A-0 394 854.

The radicals R in (I) can be identical or different and denote hydrogen, $C_1$–$C_{10}$-alkyl, $C_6$–$C_{10}$-aryl or $C_3$–$C_6$-cycloalkyl. Preferably R is methyl, ethyl, phenyl, cyclohexyl or hydrogen, especially hydrogen.

The radicals R are customarily introduced into the ring structure of (I) via the 2-amino-1-alcohols.

Suitable 2-amino-1-alcohols are generally the ring opening products of epoxides with ammonia, for example 2-amino-1-ethanol, 2-amino-1-propanol, 2-amino-1-butanol, 2-amino-1-phenyl-1-ethanol. 2-Amino-1-ethanol is preferred.

The Lewis acid used is generally a $C_1$–$C_{10}$-tetraalkoxide or tetracarboxylate of titanium, zirconium or hafnium, for example titanium (IV) n-butoxide or titanium tetraacetate.

The ring closure reaction to form the 2-oxazoline derivative can be carried out in one or two stages.

In the one-stage process, generally, the components, ie. 2-amino-1-alcohol and ester-terminated oligomers or polymers of olefinically unsaturated $C_2$–$C_{20}$-hydrocarbons, are heated in a solvent, for example xylene, to temperatures within the range from 130° to 230° C. in the presence of a Lewis acid and the alcohol being freed is distilled off. Preferably, in fact, no solvent is used.

The two-stage process is customarily employed to react the ester-terminated oligomer or polymer and the 2-amino-1-alcohol to form the 2-hydroxyethylamide. Advantageous reaction conditions for this are reaction temperatures of from 130° to 200° C. and xylene, for example, as solvent.

The $C_2$–$C_{20}$-hydrocarbon oligomers or polymers having one or two substituted or unsubstituted 2-hydroxyethylamide end groups (R-substitution pattern analogous to (I)) can then be isolated or at once cyclized to form the compounds (I) of this invention. Suitable reaction conditions for the second stage (cyclization) are temperatures within the range from 170° to 230° C., preferably no solvent, and catalysts based on Lewis acids such as, for example, titanium tetra-n-butoxide or cadmium acetate.

The two-stage process is preferably carried out in the presence of titanium alkoxides as catalysts and at a reaction temperature of from 170° to 200° C.

The 2-oxazolinyl-terminated oligomers or polymers can with advantage be used for preparing comb polymers.

Comb polymers are polymers of structural units B coupled with two or more chains of structural unit C (Comprehensive Polymer Science, Vol. 6, page 403, Pergamon Press (1989)).

Two methods can be used for preparing the comb polymers of this invention:

a) cationic ring-opening polymerization of compounds (I)

b) reaction of compounds (I) with base polymers containing substituents capable of reacting with the 2-oxazolinyl end group of (I) to form an ionic or, preferably, covalent bond ("reactive groups").

A cationic ring-opening polymerization (Y. CHUHO et al., Ring Opening Polymerization, Hanser Verlag 1993, pages 239–262) of (I) yields by scheme 1 the comb polymer (II) in which the substituents have the meanings defined for (I). El is an electrophile and Nu is a nucleophile.

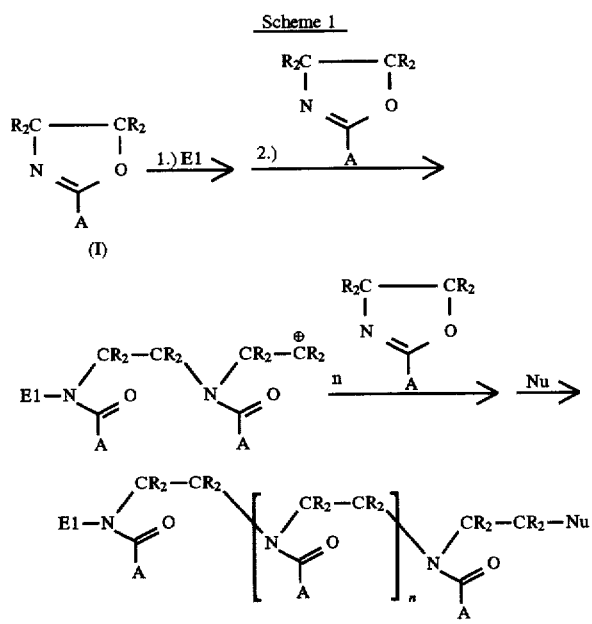

(I)

A suitable process for the cationic ring-opening polymerization of (I) is heating the 2-oxazoline derivatives (I) in a solvent, for example xylene, to temperatures within the range from 130° to 270° C., preferably from 175° to 240° C., in the presence of electrophiles as initiators. Suitable electrophiles are protic acids such as, for example, trifluoroacetic acid, fluorosulfonic acid, trifluoromethanesulfonic acid, perchloric acid, alkylating agents, for example methyl iodide, methyl p-toluenesulfonate, dimethyl sulfate, methyl 4-nitrobenzenesulfonate or Lewis acids such as tin tetrachloride, boron trifluoride, boron trifluoride/alcohol, aluminum trichloride.

Similarly, mixtures of the various electrophiles are suitable for inducing the polymerization.

In a preferred process, the polymerization is carried out without a solvent in the presence of tetravalent titanium compounds such as titanium(IV) n-butoxide at from 130° to 270° C.

The degree of polymerization n+2 of the comb polymers (II), see scheme 1, is generally from 2 to 100, preferably from 2 to 50.

The cationic ring-opening polymerization of (I) can be carried out as homopolymerization or else as copolymerization of (I) with (co)monomers other than (I). Such comonomers can be 2-substituted 2-oxazolines, but preferably 2-($C_1$-$C_4$-alkyl)oxazolines, especially 2-methyloxazoline. The resulting amphiphilic copolymers generally contain from 1 to 80 mol % of comonomer.

The comb polymers (III) can be obtained by reaction of a base polymer having reactive groups with the compounds (I) of this invention, see for example scheme 2:

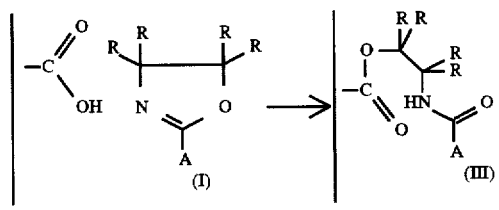

Suitable base polymers having reactive groups are those homo- and copolymers which contain -$XH_m$ groups, where X is nitrogen, phosphorus, oxygen or sulfur, and m is 1 or 2.

Preferably X is oxygen. Particular preference is given to carboxyl-containing homo- and copolymers such as poly (ethen-co-methacrylic acid), poly(ethene-co-acrylic acid), poly(butyl acrylate-co-methyl methacrylate-co-methacrylic acid), poly(butyl acrylate-co-methyl methacrylate-co-acrylic acid), poly(styrene-co-methacrylic acid), poly (styrene-co-acrylic acid), poly-(styrene-co-acrylonitrile-co-methacrylic acid), poly(styrene-co-acrylonitrile-co-acrylic acid), poly(butadiene-co-methacrylic acid), poly(butadiene-co-acrylic acid), poly(acrylonitrile-co-butadiene-co-methacrylic acid), poly(acrylonitrile-co-butadiene-co-acrylic acid), poly(ethene-co-t-butyl acrylate-co-acrylic acid), poly(ethene-co-n-butyl acrylate-co-acrylic acid).

Suitable base polymers also include partially hydrolyzed polyesters polyurethanes or polyamides.

As well as the carboxyl-functional polymers it is also possible to use their partially neutralized ionomer derivatives, for example partial sodium or zinc ionomers of poly(ethene-co-acrylic acid) or poly(ethene-co-methacrylic acid).

A suitable process for preparing the comb polymers (III) is the reaction of the base polymers having reactive groups, preferably carboxyl groups, with the compounds (I) of this invention at temperatures within the range from 180° to 260° C., preferably from 190° to 230° C., in the presence of solvents, for example xylene, dimethylformamide, N-methylpyrrolidone, or preferably in the melt of the components.

The polymer-analogous reactions proceed surprisingly fast and with very high yields (>90%).

Presumably, the compounds (I) of this invention are first protonated by the carboxyl group of the base polymers to form the oxazolinium salt (Ia), before they then react at higher temperatures, preferably above 100° C., by ring-opening to form the amide, scheme 3:

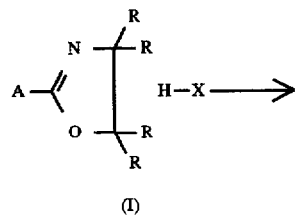

(I)

-continued
Scheme 3

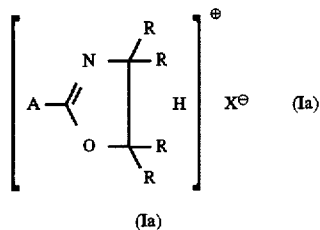

(Ia)

Generally suitable acids HX for this reaction, as well as the base polymers already mentioned, include mono- and polyfunctional $C_1$–$C_{20}$-carboxylic acids such as, for example, acetic acid, benzoic acid, terephthalic acid, adipic acid, lactic acid, acrylic acid, methacrylic acid, stearic acid and also phosphoric acid derivatives.

The compounds (I), (II) or (III) or mixtures thereof are very highly useful as compatibilizers for blends of polymers which are not miscible in the pure state.

The polymer blends are customarily based on thermoplastics or thermosets.

Suitable thermoplastics include in general all addition polymers in this class of polymers. Preference is given to homo- and copolymers of $C_2$–$C_{10}$-1-alkenes such as, for example, PE-LD, PE-HD, PE-LLD, PP or styrene polymers and also polyesters or polyamides.

Very particular preference is given to using the compounds (I), (II) or (III) or mixtures thereof as compatibilizers in blends of polyolefins/polyesters, polypropylene/polyethylene, polyisobutylene/polypropylene, polyisobutylene/polyethylene, polyisobutylene/ polyesters, polyisobutylene/polyamide.

The compounds (I), (II) or (III) of this invention, or mixtures thereof, are generally present in the thermoplastic polymer blends in an amount of from 0.2 to 20% by weight, based on the mass of the thermoplastics.

The polymer blends are generally produced using the mixing processes customary in plastics technology, for example melt extrusion.

For this, the thermoplastic components and one or more compatibilizers selected from the group consisting of the compounds (I), (II) and (III) are mixed in the melt.

If a component of the thermoplastic mixture contains, in the pure state, reactive groups (within the meaning of the preceding definition of the base polymer of (III)), it is preferable to obtain the compatibilizer (III) in situ during the mixing of the thermo-plastic components, for example in the melt extruder, by reaction of compound (I) with the reactive thermoplastic component.

Suitable thermosets for the polymer blends are epoxy resins containing carboxylic acids and/or phenols, phenol-formaldehyde condensates and carboxylic anhydrides as hardener component. Also unsaturated polyester resins, acrylate or methacrylate resins.

The salts (Ia), see scheme 3, are useful as dispersants which are able to lose their dispersing effect on heating and thus are able to prevent reemulsification following the application of dispersions.

EXAMPLES

General

NMR analyses were carried out using a Bruker AMR 300 spectrometer.

FTIR analyses were carried out using a Bruker/FS 88 spectrometer.

Elemental analyses were carried out using a Perkin Elmer Elemental Analyzer 240 C.

Thermal properties and phase transitions (glass transition temperature Tg) were determined by the method of DSC (Perkin Elmer DSC-7 heating-up rates of 9, 16, 26, 36 Kmin$^{-1}$ and extrapolation to 0 Kmin$^{-1}$).

Dynamo-mechanical analyses were carried out with rectangular 50×6×2 mm test specimens at 1 Hz, 2–5 Kmin$^{-1}$ heating-up rate and an amplitude of 0.3% using a Rheometrics Solids Analyzer RSA II.

Average molecular masses $\overline{M}_n$, $\overline{M}_w$ and molecular mass distributions $\overline{M}_w/\overline{M}_n$ were determined by the method of gel permeation chromato-graphy (GPC) involving 1,2,4-trichlorobenzene, 135° C. and polyethylene or polypropylene standards.

Example 1

Preparation of Oligopropene 500 g of propene were condensed into a 1 l steel autoclave and heated to 50° C. (pressure 22 bar). 26 ml of 1.7M toluenic methyl-alumoxane solution were added. Then 50 mg of bis(cyclopentadi-enyl)zirconium dichloride, dissolved in 4.5 ml of 1.7M toluenic methylalumoxane solution were added (Al:Zr=300:1). The oligomerization took 2 h and, after decompression of the unconverted residual propene, afforded 450 g of liquid propene oligomer.

$\overline{M}_n$=640 g/mol, $\overline{M}_w$=1600, $\overline{M}_w/\overline{M}_n$=2.5.

Example 2

Esterifying Carbonylation of Oligopropene 80 g of oligopropene ($\overline{M}_n$=640 g/mol, 0.13 mol), 12.3 g of methanol (0.39 mol), 5.7 g of dicobalt octacarbonyl (16.7 mmol) and 3.7 g of 3-picoline (40 mmol) were charged with 50 bar of CO in a 0.3 l autoclave, heated to 1600° C., and brought to a pressure of 280 bar with CO. The drop in pressure during the reaction was compensated by adding CO. After cooling and extraction of the cobalt with acetic acid under an air stream, excess methanol was distilled off to isolate the product. Yield: 84 g of ester-terminated oligopropene.

$\overline{M}_n$=660, $\overline{M}_w/\overline{M}_n$=1.73.

Example 3

Mono-N-(2-hydroxyethyl)amide-terminated Oligopropene

A mixture of 15.8 g (24 mmol) of atactic methyl-ester-terminated oligopropene (of Example 2) and 2.9 g (48 mmol) of 2-amino-1-ethanol was heated at 170° C. in the presence of 0.04 g (0.1% by weight) of Irganox® 1010 (Ciba Geigy) for 24 h. Throughout methanol was continuously distilled out of the mixture, followed by 2-amino-1-ethanol residues being removed under an oil pump vacuum to leave 16.4 g (98%) of mono-N-(2-hydroxyethyl)amide-terminated oligopropene.

FTIR (film): 1600 cm$^{-1}$ (C=O), 1559 cm$^{-1}$ (NH), $^1$H-NMR (300 MHz, CDCl$_3$): δ=6.18 (s,NH,1H); 4.98–4.68 (m,CH=); 3.72 (t,CH$_2$O, 2H); 3.44 (q, CH$_2$N, 2H); 2.52–0.68 (m, CH, CH$_2$, 200H); $^{13}$C-NMR (75 MHz, CDCl$_3$): δ=174.9 (CONH); 134.5–131.1 (C=C); 62.4 (CH$_2$O); 47.6–43.3 (CH$_2$CH); 42.4 (CH$_2$N); 41.6–38.5 (CH$_3$CH$_2$CH$_2$); 29.8 (CH$_3$CH$_2$CH$_2$CH$_2$CH); 28.0–25.0 (CH); 24.2–18.0; 15.9–14.5 ppm (CH$_3$).

$\overline{M}_n$=800 g/mol, $\overline{M}_w/\overline{M}_n$=1.70.

Example 4

Mono(1,3-oxazolin-2-yl)-terminated Oligopropene (PP-OXA)

A mixture of 40 g of mono-N-(2-hydroxyethyl)amide-terminated oligopropene (prepared as described in Example 3) and 0.16 g (0.48 mmol) of titanium(IV) n-butoxide was heated at 180° C. under an oil pump vacuum for 24 h and the reaction product was filtered through deactivated silica gel (100 g of silica gel+40 g of water).

Yield: 14.2 g.

($C_3H_4NO$) calculated (found), %C: 82.36 (82.09), %H: 13.54 (13.66), %N 2.00 (2.15); FTIR (film); 2965–2822 $cm^{-1}$ (CH), 1668 $cm^{-1}$ (C=N), 1460 $cm^{-1}$, 1379 $cm^{-1}$, 1H-NMR (300 MHz, $CDCl_3$); δ=4.14 (t, $CH_2O$, 2H); 3.75 (t, $CH_2N$, 2H); 2.29–1.81 (m, $CHCH_2CN$, 3H); 1.50 (m, CH, 13H); 1.32–0.62 ppm (m, $CH_2$, $CH_3$, 76H); $^{13}$C-NMR (75 MHz, $CDCl_3$); 168.0 (C=N), 67.0 ($CH_2O$); 54.3 ($CH_2N$); 47.6–43.4 ($CH_2CH$); 41.7–38.3 ($CH_3CH_2CH_2$); 36.5–34.5 ($CH_3CH_2CH_2CH$); 28.5–26.6 (CH); 22.1–18.8 ($CH_3$); 14.2 $CH_3CH_2CH_2$), $T_g$=(–)54.3° C.

Example 5

Poly[N-oligopropene-1-carbonylethyleneimine] (PP-PEI comb polymer) by cationic ring-opening polymerization A mixture of 1.0 g (1.43 mmol) of PP-OXA (Example 4) and 6.3 mg (0.029 mmol) of methyl 4-nitrobenzenesulfonate was heated at 200° C. for 10 minutes, then dissolved in chloroform, extracted with dilute sodium bicarbonate solution, and dried, and the solvent was evaporated under an oil pump vacuum. 0.96 g (96%) calculated (found): %C 82.36 (82.48), %H 13.54 (13.29), %N 2.00 (2.05); FTIR (film): 2967–2820 $cm^{-1}$ (NH), 1650 $cm^{-1}$ (C=O), 1460 $cm^{-1}$, 1379 $cm^{-1}$, $^1$H-NMR (300 MHz, $CDCl_3$): δ=3.38 (s, $CH_2N$, 4H); 2.29 1.90 (m, $CHCH_2CO$, 3H); 1.50 (s, CH, 13H); 1.31–0.62 ppm (m, $CH_2$, $CH_3$, 76H); $^{13}$C-NMR (75 MHz, $CDCl_3$); δ=174.5–172.0 (CO); 47.4–43.2 ($CH_2CH$); 41.5–38.4 ($CH_3CH_2CH_2$, $CH_2N$); 29.6 ($CH_3CH_2CH_2CH$); 27.2 (CH); 22.0–18.6 ($CH_3$); 14.4 ppm ($CH_3CH_2CH_2$).

$\overline{M}_n$=22100 g/mol and $\overline{M}_w/\overline{M}_n$=2.2, Tg=(–)27.8°.

Example 6

Comb Polymers by Reaction of Poly(ethene-co-methacrylic acid) with PP-OXA

A mixture of 2.0 g of poly(ethene-co-methacrylic acid) (methacrylic acid content 3 mol %), 1.41 g (2.02 mmol) of PP-OXA (Example 4) and 3.4 mg (0.1% by weight) of Irganox® 1010 was heated at 2200° C. for 15 minutes. The polymer was dissolved in chloroform, precipitated with diethyl ether and dried under an oil pump vacuum: 3.3 g (96%) of white polymer.

Elemental analysis of $(C_2H_4)_{32}[C_7H_{10}NO_3(C_3H_6)_{15}]$ calculated (found): %C 2849 $cm^{-1}$ (CH), 1730 $cm^{-1}$ (C=O), 1645 $cm^{-1}$ (NHC=O), 1540 $cm^{-1}$ (NH), 1463 $cm^{-1}$, 1379 $cm^{-1}$ ; $^1$H-NMR (300 MHz, $CDCl_3$): δ=5.62 (s, NH, 1H); 4.09 (s, $CH_2O$, 2H); 3.44 (s, $CH_2N$, 2H); 2.09 (s, $CHCH_2CONH$, 3H), 1.70–0.55 ppm (m, CH, $CH_2$, $CH_3$, 220 H), $T_g$=(–)20.9° C., $T_m$=95.1° C., ΔH=–43.0 J/g (DSC).

We claim:

1. A polymer or oligomer consisting essentially of a polymer or oligomer formed of olefinically unsaturated $C_2$–$C_{20}$-hydrocarbons, said polymer or oligomer containing one 2-oxazolinyl or two 2-oxazolinyl groups, wherein said 2-oxazolinyl group is an end group, and wherein said polymer or oligomer is represented by the structure (I)

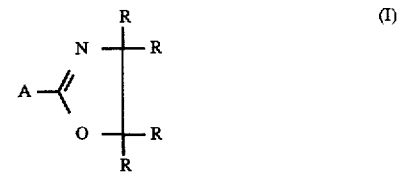

where A is a radical of said polymer or oligomer and the radicals R can be identical or different and are selected from the group consisting of hydrogen, $C_1$–$C_{10}$-alkyl, $C_6$–$C_{10}$-aryl and $C_3$–$C_6$-cycloalkyl.

2. Thermoplastic molding materials or thermosets comprising a polymer or oligomer formed of olefinically unsaturated $C_2$–$C_{20}$-hydrocarbons said polymer or oligomer comprising one or two 2-oxazolinyl groups said 2-oxazolinyl groups being end groups, and wherein said polymer or oligomer composition is represented by the structure (I)

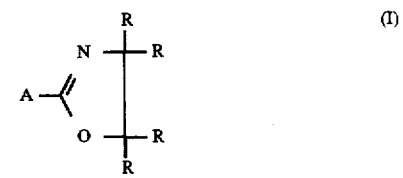

where A is a radical of said polymer or oligomer and the radicals R can be identical or different and are selected from the group consisting of:

hydrogen, $C_1$–$C_{10}$-alkyl, $C_6$–$C_{10}$-aryl and $C_3$–$C_6$-cycloalkyl.

3. A process for preparing polymers and oligomers of the structure (I) as set forth in claim 1 by oligomerization or polymerization of the olefinically unsaturated $C_2$–$C_{20}$-hydrocarbons, modification of the oligomer or polymer chains with a terminal ester group or two terminal ester groups, and subsequent Lewis acid catalyzed ring closure reaction with 2-amino-1-alcohols.

4. Compatibilizers in polymer blends having the structure of the polymers and oligomers I of claim 1.

5. Films, fibers and molded articles comprising the thermoplastic molding materials or thermosets of claim 2.

6. The polymer or oligomer of claim 1, wherein said polymer or oligomer has a number average molecular weight $M_n$ in the range from 300 to 15,000, and wherein the molecular weight distribution $M_w/M_n$ is in the range of from 1 to 3.

7. The polymer or oligomer of claim 1, wherein said olefinically unsaturated $C_2$–$C_{20}$-hydrocarbon is selected from the group consisting of 1,3-butadiene, styrene, α-methyl styrene, ethene, propene, 1-butene, isobutene, 1-pentene, 1-hexene, 1-heptene, 1-octene, 1-nonene, and 1-desene.

8. The polymer or oligomer of claim 1, wherein said olefinically unsaturated $C_2$–$C_{20}$-hydrocarbon is selected from the group consisting of propene and isobutene.

* * * * *